(12) United States Patent
Volovec (10) Patent No.: US 9,551,433 B2
(45) Date of Patent: Jan. 24, 2017

(54) BALANCING AND CONTROL VALVES

(75) Inventor: Peter Volovec, Kapele (SI)

(73) Assignee: TA HYDRONICS S.A., Eysins (CH)

( * ) Notice: Subject to any disclaimer, the term of this patent is extended or adjusted under 35 U.S.C. 154(b) by 536 days.

(21) Appl. No.: 13/992,019

(22) PCT Filed: Dec. 7, 2011

(86) PCT No.: PCT/EP2011/006144
§ 371 (c)(1),
(2), (4) Date: Aug. 7, 2013

(87) PCT Pub. No.: WO2012/076167
PCT Pub. Date: Jun. 14, 2012

(65) Prior Publication Data
US 2013/0306172 A1    Nov. 21, 2013

(51) Int. Cl.
*F16K 37/00*     (2006.01)
*F16K 1/12*      (2006.01)
(Continued)

(52) U.S. Cl.
CPC ............. *F16K 37/0016* (2013.01); *F16K 1/12* (2013.01); *F16K 31/52* (2013.01);
(Continued)

(58) Field of Classification Search
CPC .................. Y10T 137/8275; Y10T 137/3367; Y10T 137/3421; F16K 1/12; F16K 37/0016; F16K 31/52; F16K 31/53; F16K 31/54; F16K 31/52433; F16K 31/52425
(Continued)

(56) References Cited

U.S. PATENT DOCUMENTS 1,769,845 A * 7/1930 Klouman .............. F16K 31/363
                                                        137/220
2,075,812 A * 4/1937 Kerr .......................... F16K 1/12
                                                        137/219
(Continued)

FOREIGN PATENT DOCUMENTS

CN       101270829 A    9/2008
EP       1834116 B1     10/2013
(Continued)

OTHER PUBLICATIONS

International Search Report for PCT/EP2011/006144 dated Jan. 30, 2012.
(Continued)

*Primary Examiner* — Marina Tietjen
*Assistant Examiner* — Frederick D Soski
(74) *Attorney, Agent, or Firm* — Heslin Rothenberg Farley & Mesiti P.C.

(57) ABSTRACT

A combined balancing and control valve suitable for use in a hydronic system is provided, including a chamber enclosing a plug (6, 10, 16, 15), a seat (13) and a cam and pinion mechanism (20-28) for adjusting the separation of the plug (6, 10, 16, 15) and the seat (13). Pressure ports (42, 43) are included for monitoring the rate of fluid flow across the separation. The cam and pinion mechanism provides a motion transformation (20-27) operable by an actuator (28) to control the motion of the valve plug (6, 10, 16, 15). The valve plug motion provides a favorable change in conductance of the valve for a given change in the actuator position. The actuator (28) is calibrated in increments which correspond to incremental changes in the conductance.

26 Claims, 5 Drawing Sheets

(51) Int. Cl.
*F16K 31/524* (2006.01)
*F16K 31/54* (2006.01)
*F16K 31/52* (2006.01)
*F16K 31/53* (2006.01)

(52) U.S. Cl.
CPC ........ *F16K 31/52433* (2013.01); *F16K 31/53* (2013.01); *F16K 31/54* (2013.01); *Y10T 137/8275* (2015.04)

(58) Field of Classification Search
USPC .................. 251/250, 257, 259, 263, 229
See application file for complete search history.

(56) References Cited

U.S. PATENT DOCUMENTS

| | | | | |
|---|---|---|---|---|
| 2,646,767 | A * | 7/1953 | Hanson | F16K 1/32 |
| | | | | 116/277 |
| 3,334,654 | A * | 8/1967 | Donner | F16K 31/504 |
| | | | | 137/553 |
| 3,856,042 | A | 12/1974 | Fletcher et al. | |
| 4,569,366 | A * | 2/1986 | West | F16K 37/0016 |
| | | | | 116/277 |
| 5,190,068 | A * | 3/1993 | Philbin | G01F 15/024 |
| | | | | 137/486 |
| 5,660,198 | A * | 8/1997 | McClaran | G05D 16/106 |
| | | | | 137/10 |
| 6,513,556 | B1 | 2/2003 | Nimberger et al. | |
| 6,923,203 | B2 | 8/2005 | Wark | |
| 2002/0005217 | A1 * | 1/2002 | Lyons | F16K 1/126 |
| | | | | 137/220 |
| 2010/0102259 | A1 * | 4/2010 | Forster | F16K 1/12 |
| | | | | 251/129.01 |
| 2010/0176586 | A1 * | 7/2010 | Chang | F16L 29/002 |
| | | | | 285/88 |

FOREIGN PATENT DOCUMENTS

| | | | |
|---|---|---|---|
| GB | 2166847 A | 5/1986 | |
| JP | 53-143220 | 1/1977 | |
| JP | 1-128078 | 8/1989 | |
| JP | 4-133108 A | 7/1992 | |
| RU | 2361260 C2 | 7/2009 | |
| RU | 88760 | 11/2009 | |
| SI | WO 2010103408 A2 * | 9/2010 | ............. F16K 1/126 |
| WO | 9427069 | 11/1994 | |

OTHER PUBLICATIONS

Office Action dated Dec. 1, 2015 for corresponding Japanese Patent Application No. 2013-542408, English translation, 13 pages.
Office Action dated Feb. 1, 2016 for corresponding Chinese Patent Application No. 201180058466.1, English translation, 11 pages.
Office Action dated Apr. 4, 2016 for corresponding Russian Patent Application No. 2013123116/06(034140), English translation, 5 pages.

* cited by examiner

BALANCING AND CONTROL VALVES

CROSS-REFERENCE TO RELATED APPLICATIONS

This application is a continuation of PCT Application PCT/EP2011/006144, filed Dec. 7, 2011, and published under the PCT Articles in English as WO 2012/076167 on Jun. 14, 2012. PCT/EP2011/006144 claimed priority to European Application No. EP10015371.7, filed Dec. 7, 2010. The entire disclosures of PCT/EP2011/006144 and European Application No. EP10015371.7 are incorporated herein by reference in their entirety.

BACKGROUND OF THE INVENTION

Field of the Invention

The present invention relates to control valves and balancing valves commonly used in hydronic systems to monitor and adjust fluid flow rate and ensure a relatively steady flow of fluid through the system. The invention provides a control valve incorporating a novel design of balancing mechanism which results in better performance of a hydronic system when the improved valve is incorporated.

Background Art

In fluid networks, it is common to distribute fluid from a source to one or more points of consumption (loads). In order to provide the correct amount of fluid under varying demands, one or more control valves are commonly provided. These control valves respond to a control signal to create variable restrictions in the system providing an appropriate amount of fluid to each load. For example, the control signal might be supplied by a thermostat, and the valve would respond by changing the flow of heating or cooling fluid through a heat exchanger. If these control valves are chosen with a maximum opening that is larger than the maximum needed for the application, then they must be controlled to close excessively at all times. This excessive closure results in unstable control as the control valve changes from an open to a closed condition repeatedly rather than settling at the proper location. Conversely, if the valve is chosen with too small a maximum opening, excessive pumping energy is required to address unnecessary pressure drops arising in the system. This problem is compounded by the fact that control valves are ordinarily available only in fixed steps, forcing the user to select one or another type of error.

These systems also normally have differing amounts of surplus pressure at different terminals. An ordinary control valve provides no means for reading the flow rate of the fluid, nor of manually adjusting its maximum opening which will cause an ordinary control valve to flow incorrectly. While the amount of surplus pressure might be calculated in theory, in practice the calculations are often not done due to their complexity, or are inaccurate due to construction variations. This problem is frequently addressed by installing balancing valves, which provide a calibrated adjustable restriction and a means of measuring the flow rate. A balancing contractor is then employed to adjust these balancing valves throughout the system so that at maximum flow conditions all terminals receive the correct flow of fluid without excess.

A limitation of current techniques is that the restriction created by the balancing valve is not taken into account by the control valve, so that a portion of the control valve's stroke is wasted.

Some prior devices combine the function of a control valve and a balancing valve in a single unit, providing improved performance of the combined unit. With the control function and balancing accomplished by a single device, it is possible to provide improved control performance tailored to the exact conditions experienced at a given terminal.

BRIEF SUMMARY OF THE INVENTION

The present invention seeks to provide a control valve with an integrated balancing component which overcomes the problems presented by prior art arrangements.

In accordance with the present invention, there is provided a combined balancing and control valve suitable for use in a hydronic system, the valve comprising a chamber enclosing a plug, a seat and an adjustment means for adjusting the separation of the plug and the seat, monitoring means for monitoring the rate of fluid flow across the separation and characterized in that the adjustment means comprises a motion transformation means operable by an actuator to restrict the motion of the valve plug whereby to provide a favourable change in conductance of the valve for a given change in the actuator position and in that the actuator is calibrated in increments which correspond to incremental changes in the conductance.

The adjustment needed for the balancing of circuits is accomplished by limiting the maximum opening of the control valve by use of a calibrated scale which provided a known restriction at any particular setting. The flow rate reading needed for the balancing of circuits is accomplished by reading the differential pressure across the valve restriction. In one practical embodiment of the invention, the adjustment means includes a calibration means having a scale visible outside of the chamber and is operable to adjust a maximum possible separation of the plug and seat in increments corresponding to units provided on the scale. After the balancing procedure, the actuator can change the conductance of the valve to any appropriate value between closed and the set maximum value in response to an external control signal.

In preferred embodiments, the calibration means conveniently emerges from the chamber in the form of a rod having a linear scale presented along its length and linear movement of the rod is translated to one or both of the valve seat and plug whereby to adjust the separation of the seat and plug by an amount which corresponds to the distance traveled by the rod according to the linear scale.

In an option, the rod is surrounded by a threaded sleeve operable to limit its travel, which engages with a complementary thread fixed relative to the chamber and linear movement is effected by rotating the sleeve. Optionally, the sleeve could be prevented from rotating, and it could engage against a nut which is translationally fixed with respect to the housing. In either option, a scale may be provided about the circumference of the rotating element whether in addition to the aforementioned linear scale (for example to allow fine adjustment) or as the only scale.

Desirably the valve and seat are arranged in axial alignment with the intended direction of flow of fluid in the system. In an axial geometry, fluid flows into and out of the valve along a single axis, and the valve has a plug which moves along that same axis. This geometry provides reduced turbulence and consequently less noise than geometries which require the fluid to change direction excessively. This geometry also allows the valve to be more compact than other geometries.

In one preferred embodiment, the calibrated rod extends into the chamber to include a toothed rack portion, this engages with a pinion which in turn is fixed to a cam plate of a cam mechanism which cam plate rotates with the pinion to effect movement of a cam follower, the cam mechanism being operable to adjust the separation of the plug and seat. The cam follower is conveniently fixed to a shaft to which in turn is fixedly mounted the seat or plug. As the cam follower follows the guide provided in the cam plate, axial movement of the shaft occurs thereby adjusting the separation of the plug and seat.

The geometry of the cam is selected to translate constant motion from an actuator into a favourable motion of the plug, thereby providing a favourable change in the fluid conductance of the valve in response to a control signal. For example, the cam might be so designed that the valve opening compensates for the output characteristic of a heat transfer device, thereby creating a more nearly linear relation between the control signal and the heat transfer. Such a linear relationship between the control signal and the desired controlled variable is sometimes referred to as a constant gain and is advantageous to control systems. The cam motion may also provide a mechanical advantage to an actuator in moving the plug as it nears its closed position, thereby reducing power needed to drive the actuator.

Preferably the plug and seat are configured to provide a fluid conductance which is approximately proportional to the movement of the plug. Optionally, the plug may be provided with partial differential pressure compensation, further reducing the needed power of the actuator.

Optionally, axial movement of the shaft is resisted by a biasing spring which might be arranged either to bias the valve in an open position or a closed position. Desirably, the biasing spring urges the valve to open, this assists in preventing oscillations.

It is common in control valves involving linear motion of the plug for the pressure of the system to urge the valve to an open position as a result of the pressure differential between the interior of the valve and the exterior location where the actuator is placed. Therefore in an optional improvement on the already described invention, this problem is addressed by providing two shafts of equal diameters arranged for simultaneous axial movement in opposing directions between the two areas of different pressure.

As already stated, in some embodiments, one or more springs may be provided to create a biasing force, such that the valve is either always urged toward an open position or always urged towards a closed position. In such cases the balancing of the differential pressure may additionally be configured to provide a "biasing force" in the same direction.

BRIEF DESCRIPTION OF THE DRAWINGS

By way of example an embodiment of the invention will now be further described with reference to the accompanying drawings in which.

DETAILED DESCRIPTION

Figure 1A:
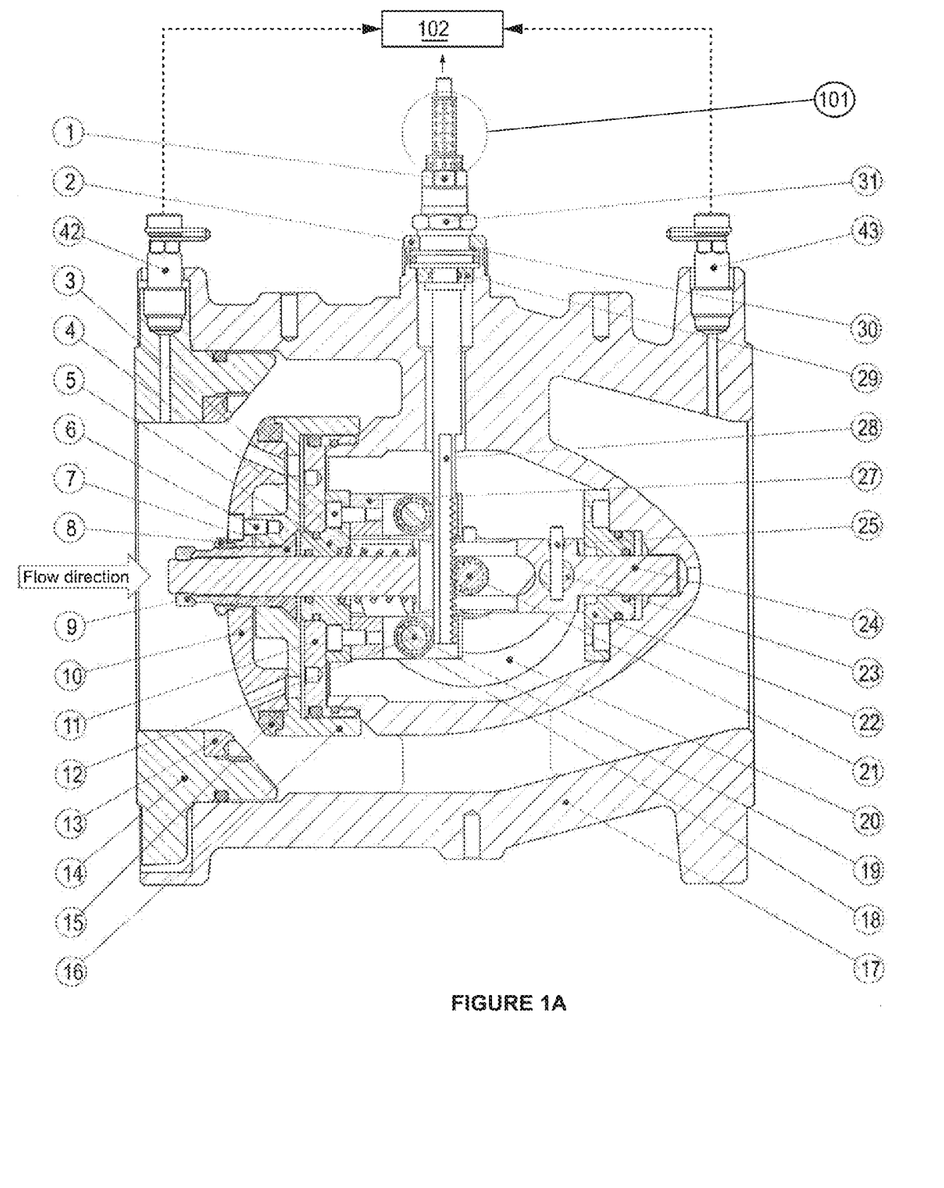
FIG. 1A shows a side view of a valve in accordance with the invention in partial cut away view.
Figure 4:
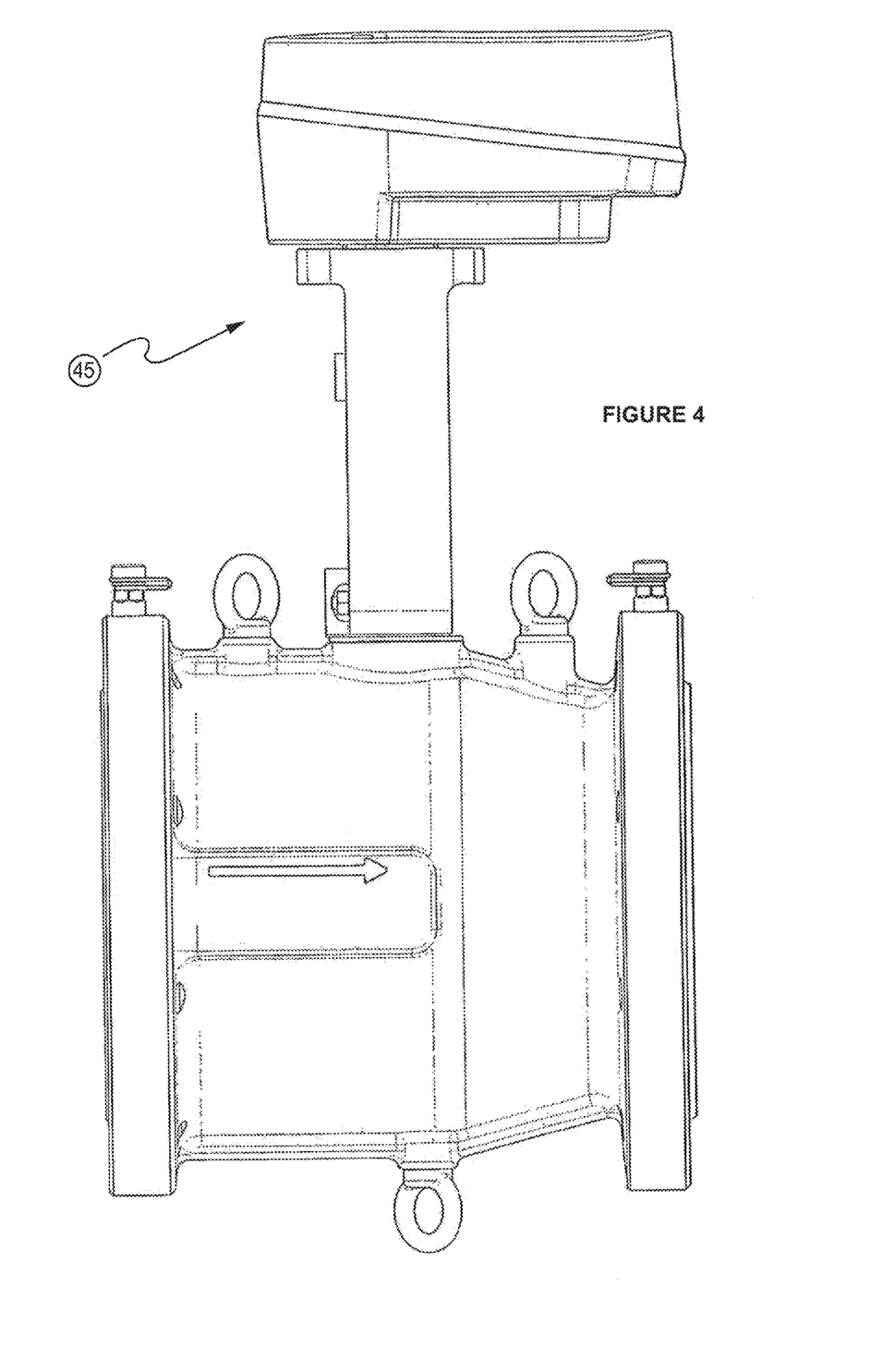
FIG. 4 shows an external side view of the valve with an electromechanical actuator attached.

The valve of FIG. 1A generally comprises a housing (14, 17) which defines a chamber in which is provided a plug assembly (6, 10, 15, 16) and a seat (13) in axial alignment along the direction of flow of fluid in hydronic system. The plug (6, 10, 15, 16) is carried on a shaft (24) whose axis passes through the centre of the plug (6, 10, 15, 16). The shaft (24) also carries a cam follower assembly (23, 25). A calibration means is provided in the form of assembly (1, 2, 29, 30 and 31) which interacts with a rod (28) which passes through a sealed inlet chamber which is free to slide axially by means of a bearing mounted in the inlet. The rod is adapted to connect to an electromechanical or other controlled drive means (45 in FIG. 4). The calibrated stroke limiting mechanism (1, 2, 28, 29, 30, 31) is provided to adjust the maximum opening of the valve during a balancing procedure.

The rod (28) extends into the chamber in a direction perpendicular to the motion of the plug and parallel with the face of the plug (6, 10, 15, 16) in the form of a toothed portion. The toothed portion engages with a pinion gear (21) which is fixedly mounted by means of pin (26) to a cam plate which incorporates a guide (20) for a cam follower (23). The cam follower (23) is fixedly mounted on the shaft (24) and the pinion gear (21) passes through a slot in the shaft (24) so as not to obstruct its axial movement. As the rod moves axially, the pinion gear (21), through its engagement with the teeth of rod (28) is forced to rotate and the cam plate rotates with it. As the cam plate rotates, the cam follower (23) is forced to travel in the cam guide (20) carrying with it the shaft (24). Movement of the shaft (24) in any direction other than axially is prevented by the housing (14, 17), engagement of the pinion gear (21) in the slot of the shaft (24) and other components. The plug (6, 10, 15, 16), carried on the shaft (24) is also forced to move axially thereby adjusting the separation of the plug (6, 10, 15, 16) and seat (13). The distance over which the plug is caused to travel is measured by a scale provided on the area of the rod which emerges from the chamber. A distance traveled by the rod along the scale corresponds to a pre calculated travel distance for the plug (6, 10, 15, 16). The shaft (24) is assisted to move smoothly by rack bearings (12, 18, 19) which hold the rack portion against the pinion without impeding its linear motion.

Just behind the plug (6, 10, 15, 16) encircling the shaft (24) is a spring (4). The spring (4) is compressed so as to urge the plug (6, 10, 15, 16) and seat (13) to separate.

A chamber is formed between the plug (16) and cover plate (11) which is connected by a series of passages to strategically located points upstream of the plug (16). The pressure in this chamber partially compensates the pressure difference across the valve to reduce the actuation force required to move the plug.

Front and rear bearing plates (5, 22) seal around the shaft (24) at opposite ends separate fluid from air in the chamber. The circumference of the shaft (24) where it passes through each of the bearing plates (5, 22) is equal.

Figure 2:
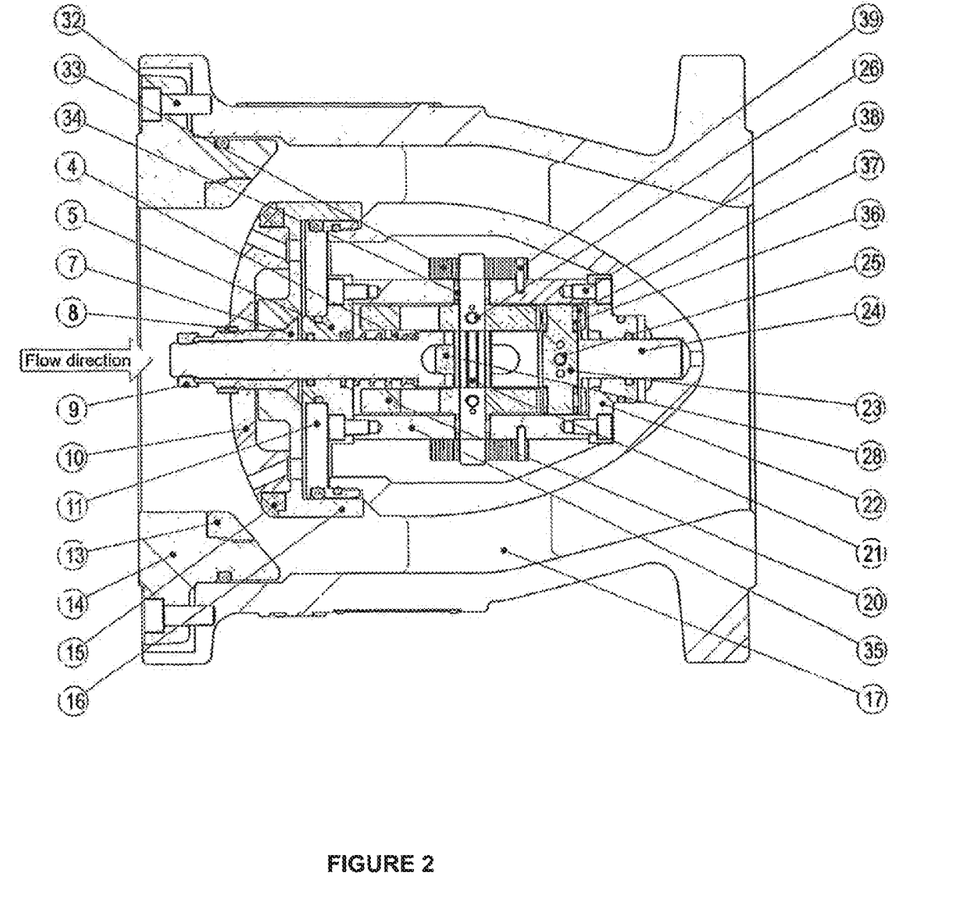
FIG. 2 shows a top view of the valve of FIG. 1 in partial cut away view.

With reference to FIG. 2 it can be seen that the pinion gear (21) is mounted in a rod bearing (34) and follower bearings (36, 37) assist in the smooth travel of the cam follower (23). By means of pin (39) and biasing spring (33), the positioning of the cam plate with respect to the cam follower (23) is biased so as to urge a return of the cam follower (23) to its position as shown in FIG. 1A, and consequently resists downward strokes of the rod.

The pressure differential across the valve is monitored using ports (42, 43) positioned on opposing sides of the chamber. The scale used on the calibration means (1, 2, 29, 30 and 31) is chosen to correlate with a scale used to monitor the differential pressure such that flow rate can be determined from these two readings.

Figure 3:
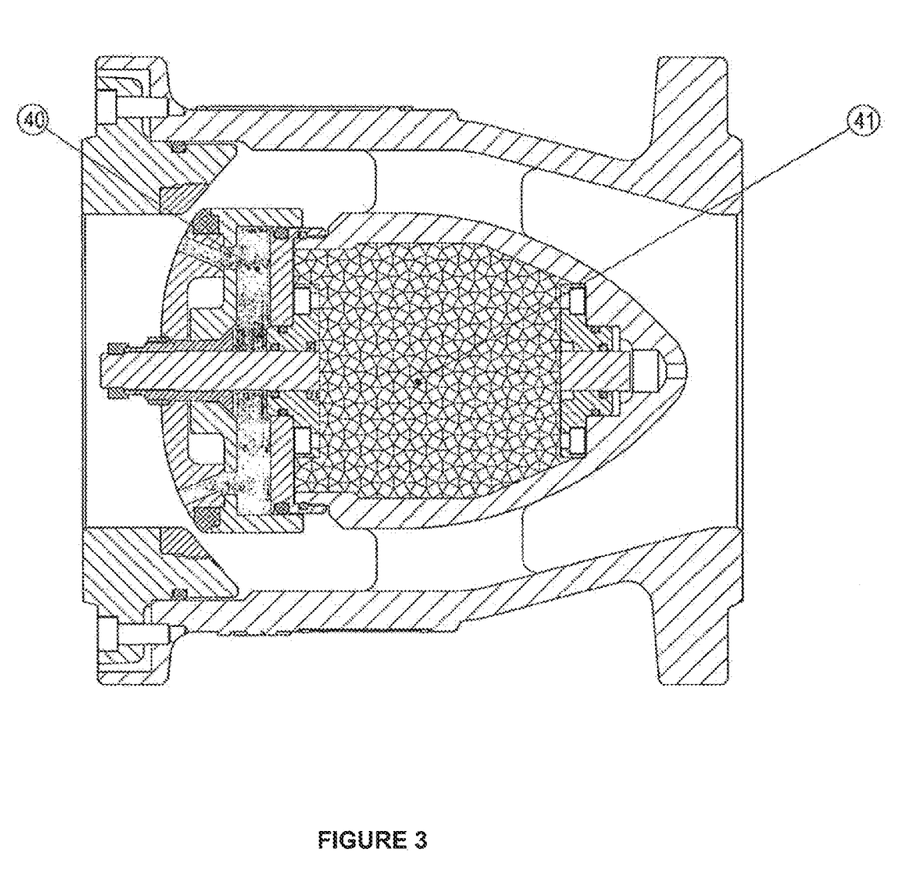
FIG. 3 shows the valve in cross section partially through its travel.

In FIG. 3, two regions of interest are shown with hatching patterns: a pressure compensation chamber (40) and its associated passages which connect to the upstream region of the chamber. Positioning of the passages is selected to give as little force against the actuator as possible while maintaining stability. The mechanism chamber (41) is separated from the fluid and is connected to the air outside of the chamber.

In use, a maximum operational flow is first applied to the valve and by using the combination of the calibration scale and the measured pressure differential at that flow rate, the optimal maximum separation of the plug and seat is identified and the valve adjusted to restrict the maximum separation to that optimum. After which a controlled drive means can operate an actuator to move the valve between a closed position and the optimum maximum opening position in the normal operation of the valve in response to the external control signal.

Figure 1B:
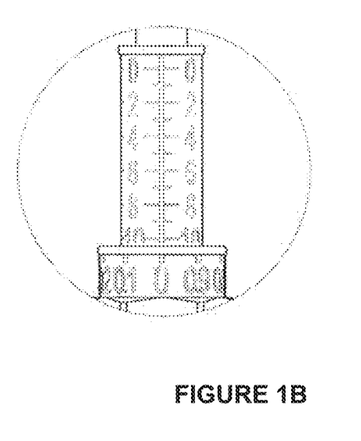
FIG. 1B shows a magnified view of the calibration means in FIG. 1A.

The following table summarises the referenced components in FIGS. 1, 2 and 3.

| Ref: | Label | Notes |
|---|---|---|
| 1, 2 | Stroke Limit Setting | Used to set the maximum flow |
| 4 | Biasing Spring | Urges the mechanism toward an open position, helping prevent oscillation |
| 5 | Front bearing plate | Includes a seal around shaft 24, separating water from air |
| 6 | plug screw | Attaches two halves of the plug together, capturing the seal |
| 7, 8, 9 | Plug Position Calibration Setting | These parts are used during factory calibration to ensure that the plug presses against the seat with the correct force at the end of its stroke |
| 6, 10, 16, 15 | Plug | Two metal pieces are held together with screws, and a resilient seal is held between them |
| 15 | Plug Seal | Resilient face of plug, which helps with sealing |
| 11 | mechanism sealing plate | Keeps water out of mechanism, removable for assembly and possible repair |
| 12, 18, 19 | Rack Bearing | |
| 13 | Seat | Cooperates with plug to create control restriction |
| 14, 17 | Housing | |
| 20 | Cam | |
| 21 | Pinion | Connected by a shaft to cam plate 20 |
| 22 | Rear Bearing Plate | Includes seal around shaft 24 separating air from water again, but in the opposite direction: shaft 24 is compensated with respect to the pressure difference between water and air. |
| 23 | Follower Rod | The cam 20 has a groove which defines the motion of the plug. A follower moves within this groove, and includes a small shaft and a bearing. There are actually two bearings and two cams, but they function as a single cam/follower pair |
| 24 | Shaft | Transmits motion from the characterizing mechanism to the plug |
| 25 | Follower Shaft Pin | Connects the follower rod 23 to shaft 24 |
| 26 | Cam Pin | Connects the cam to pinion |
| 27 | Mechanism support plate | Supports bearings for rack and pinion |
| 28 | Stem | Connects actuator to characterizing mechanism |
| 29, 30 | Stroke Limit | See 1, 2 above |
| 31 | Setting | |
| 32 | Housing Screw | Connects parts of the housing |
| 33 | Spiral Bias Spring | This component may be deleted in future versions |
| 34 | Pinion Rod Bearing | |
| 35 | Mechanism Support Plate | |
| 36, 37 | Follower Bearing | |
| 38 | Mechanism Support Screw | |
| 39 | Spiral Spring Pin | |
| 40 | Pressure compensation chamber | |
| 41 | Mechanism chamber | |
| 42, 43 | Pressure ports | Monitor differential pressure across the valve chamber |

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A combined balancing and control valve suitable for use in a hydronic system, the valve comprising a chamber enclosing a plug, a seat and an adjustment means for adjusting a separation of the plug and the seat, monitoring means for monitoring a rate of fluid flow across the separation, wherein the adjustment means comprises a motion transformation means operable by an actuator to control a motion of the valve plug, wherein the valve plug provides a favorable change in fluid conductance of the valve for a given change in a position of the actuator, wherein the actuator is calibrated in increments which correspond to incremental changes in the conductance, wherein the actuator comprises a rod operable on linear motion to actuate the motion transformation means to adjust separation of the plug and seat and an associated calibration means emerging from the chamber having a scale visible outside of the chamber and is operable to limit a maximum separation between the plug and seat which can be created by the actuator, wherein the actuator rod comprises a toothed rack portion, wherein the motion transformation means is a pinion engaging with the toothed rack portion, the pinion being fixed to a cam plate defining a cam guide of a cam mechanism, and wherein the cam plate rotates with the pinion to effect movement of a cam follower, the cam mechanism being operable to adjust the separation of the plug and seat, and a housing and a biasing mechanism, the biasing mechanism urging the rod to emerge from the housing.

2. A valve as claimed in claim 1, wherein the calibration means comprises one or more threaded members arranged to block the linear motion of the actuator by a predetermined increment based on a rotation of the one or more threaded members.

3. A valve as claimed in claim 1, wherein the valve plug and seat are arranged in axial alignment with an intended direction of flow of fluid in the system.

4. A valve as claimed in claim 1, further comprising a shaft to which the cam follower is fixed, the shaft being fixedly mounted to the plug, wherein as the cam follower follows the cam guide provided in the cam plate axial movement of the shaft occurs thereby adjusting the separation of the plug and seat.

5. A valve as claimed in claim 1, wherein the plug and the seat are configured such that the fluid conductance is approximately proportional to a movement of the plug.

6. A valve as claimed in claim 1, wherein the plug is capable of partial differential pressure compensation.

7. A valve as claimed in claim 1, further comprising a pressure compensation chamber and an inlet and an outlet, arranged such that fluid pressure is transferred through the pressure compensation chamber to reduce a force required from the actuator to overcome a given pressure difference between the inlet and outlet.

8. A valve according to claim 1, wherein the motion transformation means is located within a path of fluid flow.

9. A valve as claimed in claim 1, wherein the plug is configured to reach a fully closed position at a predefined position of the actuator.

10. A valve as claimed in claim 1, further comprising monitoring means for monitoring a rate of fluid flow through the valve; and calibration means for calibrating the actuator, the calibration means comprising a scale; wherein the monitoring means and the calibration means are together configured to enable a user to calculate the rate of fluid flow through the valve from a reading on the scale and a determination of a differential pressure across the valve.

11. A valve as claimed in claim 1, further comprising a biasing spring to resist axial movement of the plug relative to the seat.

12. A valve as claimed in claim 11, wherein the biasing spring is arranged to urge the valve to open.

13. A valve as claimed in claim 1, wherein the adjustment means is configured to adjust the separation between the plug and the seat continuously between a fully open position and a fully closed position.

14. A valve as claimed in claim 13, wherein the plug includes a resilient sealing means, said sealing means being configured to cooperate with the seat through most of the separation.

15. A combined balancing and control valve suitable for use in a hydronic system, the valve comprising a chamber enclosing a plug, a seat and an adjustment means for adjusting a separation of the plug and the seat, monitoring means for monitoring a rate of fluid flow across the separation, wherein the adjustment means comprises a motion transformation means operable by an actuator to control a motion of the valve plug, wherein the valve plug provides a favorable change in fluid conductance of the valve for a given change in a position of the actuator, and wherein the actuator is calibrated in increments which correspond to incremental changes in the conductance, wherein the actuator comprises a rod operable on linear motion to actuate the motion transformation means to adjust separation of the plug and seat and an associated calibration means emerging from the chamber having a scale visible outside of the chamber and is operable to limit a maximum separation between the plug and seat which can be created by the actuator, wherein the actuator rod comprises a toothed rack portion, wherein the motion transformation means is a pinion engaging with the toothed rack portion, the pinion being fixed to a cam plate defining a cam guide of a cam mechanism, wherein the cam plate rotates with the pinion to effect movement of a cam follower, the cam mechanism being operable to adjust the separation of the plug and seat, and further comprising a shaft to which the cam follower is fixed, the shaft being fixedly mounted to the plug, wherein as the cam follower follows the cam guide provided in the cam plate axial movement of the shaft occurs thereby adjusting the separation of the plug and seat, and front and rear bearing plates, the shaft being received at opposing ends thereof and having a same diameter where the shaft passes through each of the two bearing plates.

16. A valve as claimed in claim 15, wherein the calibration means comprises one or more threaded members arranged to block the linear motion of the actuator by a predetermined increment based on a rotation of the one or more threaded members.

17. A valve as claimed in claim 15, wherein the valve plug and seat are arranged in axial alignment with an intended direction of flow of fluid in the system.

18. A valve as claimed in claim 15, further comprising a shaft to which the cam follower is fixed, the shaft being fixedly mounted to the plug, wherein as the cam follower follows the cam guide provided in the cam plate axial movement of the shaft occurs thereby adjusting the separation of the plug and seat.

19. A valve as claimed in claim 15, wherein the plug and the seat are configured such that the fluid conductance is approximately proportional to a movement of the plug.

20. A valve as claimed in claim 15, wherein the plug is capable of partial differential pressure compensation.

21. A valve as claimed in claim 15, further comprising a biasing spring to resist axial movement of the plug relative to the seat.

22. A valve as claimed in any claim 15, further comprising a pressure compensation chamber and an inlet and an outlet, arranged such that fluid pressure is transferred through the pressure compensation chamber to reduce a force required from the actuator to overcome a given pressure difference between the inlet and outlet.

23. A valve as claimed in claim 15, wherein the adjustment means is configured to adjust the separation between the plug and the seat continuously between a fully open position and a fully closed position.

24. A valve according to claim 15, wherein the motion transformation means is located within a path of fluid flow.

25. A valve as claimed in claim 15, wherein the plug is configured to reach a fully closed position at a predefined position of the actuator.

26. A valve as claimed in claim 15, further comprising monitoring means for monitoring a rate of fluid flow through the valve; and calibration means for calibrating the actuator, the calibration means comprising a scale; wherein the monitoring means and the calibration means are together configured to enable a user to calculate the rate of fluid flow through the valve from a reading on the scale and a determination of a differential pressure across the valve.

* * * * *